INVENTORS
DAVID C. HARPER
RAYMOND T. WRIGHT
JAMES E. YOUNG
Anthony D. Cennamo
Stanley Z. Cole
ATTORNEY Nov. 7, 1967 D. C. HARPER ET AL 3,351,920

THERMOPLASTIC COMPUTER MEMORY STORAGE SYSTEM

Filed Jan. 2, 1964 4 Sheets-Sheet 2

INVENTORS
DAVID C. HARPER
RAYMOND T. WRIGHT
JAMES E. YOUNG

Anthony D. Cennamo
Stanley Z. Cole
ATTORNEY

Nov. 7, 1967 D. C. HARPER ET AL 3,351,920

THERMOPLASTIC COMPUTER MEMORY STORAGE SYSTEM

Filed Jan. 2, 1964 4 Sheets-Sheet 3

INVENTOR.
DAVID C. HARPER
RAYMOND T. WRIGHT
JAMES E. YOUNG

Anthony D. Cennamo
Stanley Z. Cole
ATTORNEY

Nov. 7, 1967 D. C. HARPER ET AL 3,351,920

THERMOPLASTIC COMPUTER MEMORY STORAGE SYSTEM

Filed Jan. 2, 1964 4 Sheets-Sheet 4

INVENTORS
DAVID C. HARPER
RAYMOND T. WRIGHT
JAMES E. YOUNG

Anthony D. Cennamo
Stanley Z. Cole
ATTORNEY 3,351,920
THERMOPLASTIC COMPUTER MEMORY STORAGE SYSTEM David C. Harper, Rochester, Raymond T. Wright, West Webster, and James E. Young, Pittsford, N.Y., assignors to Xerox Corporation, Rochester, N.Y., a corporation of New York Filed Jan. 2, 1964, Ser. No. 335,256
12 Claims. (Cl. 340—173)

Figure 1:
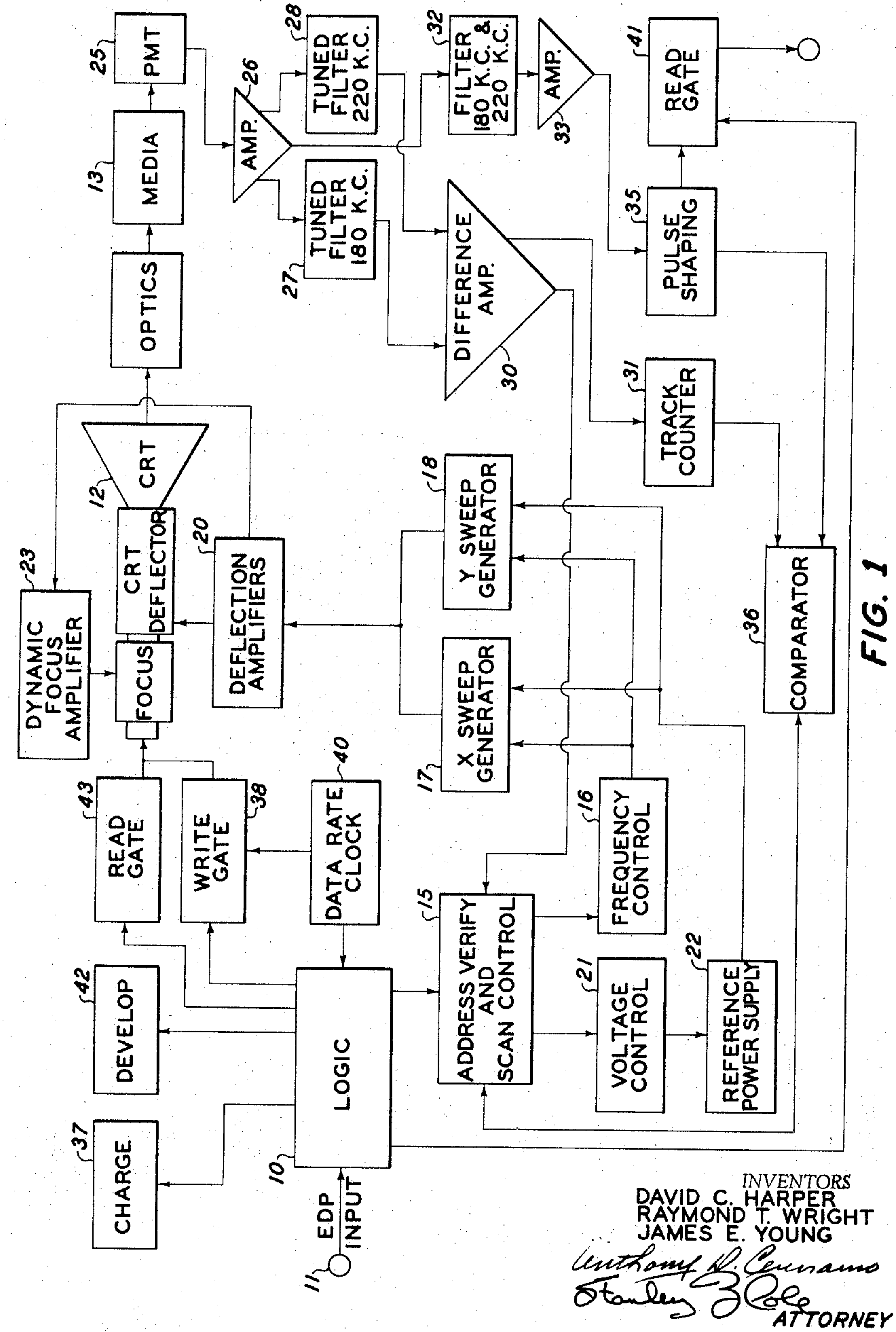

The present invention relates generally to computer memory storage devices and particularly to novel method and means of storing information on an electrostatically deformable surface.

Computer memory devices based on present technology may be categorized according to the life of the stored information and its retention while undergoing read-out. Volatile memories lose the stored information over a period of time due to leakage effects or power losses. On the other hand, nonvolatile memories retain the stored information for an indefinite period of time and are not subject to power-failure information losses. The process of reading the stored data can be destructive or nondestructive depending upon the type of memory and mode of data readout.

The read access rates and storage capacities of the technologies currently available are shown in "Comparison of Storage Methods" by W. W. Carver in Electronic Industries, August 1962. A review of the computer memory devices relating to the random access, nonvolatile, nondestructive read-out computer peripheral memory category is in order. The magnetic card memory devices use plastic cards or chips coated with a ferromagnetic material and are sometimes overcoated with a plastic film. Normally the cards are applied mechanically to a rotating drum mechanism and written or read using a multiple track recording head in a manner similar to magnetic tape. Print density is limited by mechanical registration tolerances. The cards are stored in a magazine for quick change and ease of handling. The bit density on this recording medium is limited by the positional accuracies obtainable in the drum read/write mechanism and by card location. Transfer rates of up to 100,000 characters per second and maximum access times of 0.2 second are reported.

Magnetic tapes consist of a plastic strip coated with a ferromagnetic material. The bits are recorded on the tape using magnetic polarization with a multiple track head at longitudinal densities of 200 to 1000 bits per inch. Sequential access time (average) is typically 2 to 3 minutes in the random mode and 4 to 5 milliseconds to nearest block in the sequential mode. Laboratory recordings have been made at 2000 bits per inch and 500 tracks per inch. The extremely accurate transport mechanisms required and the dust problems involved make this recording medium impractical for normal usage.

In magnetic drums a high-precision drum coated with a ferromagnetic material is rotated at speeds of up to 17,500 r.p.m. Data are recorded by magnetic polarization in parallel or helical tracks, with up to one head per track. The read/write head in the magnetic drum device is usually floated. Digital information is recorded in the parallel mode at normal recording densities of 325–650 bits per inch. Some units are available which record at densities of up to 750 bits per inch. Longitudinal track densities can be as high as 50 tracks per inch. Typical storage capacities range from $10^5$ to $10^8$ bits depending on drum size. Access time, which is equivalent to one drum revolution, is in excess of 3.4 milliseconds.

In a memory disc of the rigid type a disc memory frequently utilizes two faces of a disc coated with ferromagnetic materials. Read/write heads are mounted on hydraulic servo rocker arms and are simultaneously servoed to access any track on the disc. Several discs can be mounted on a common shaft to increase capacity, and multiple zones are utilized to take advantage of the tracks farther from the center of the disc.

The cryotron utilizes a superconductive, deposited film, which operates at liquid helium temperature (4.1° K.). The present devices use 0.009 inch tantalum wire gates with 0.003 inch niobium wire control winding coiled around the gate. Under superconductive conditions the gate will permit infinite current flow until resistance is restored by a magnetic field set up by the current in the control.

A biaxial multiple aperture core consists of a small rectangular bar of ferromagnetic material having two orthogonal holes through the finite element. The operation is based on the principle of interference between orthogonal magnetic fields in the magnetic material between holes. Its use is for electrically alterable, nondestructive read/random access storage. This device has been interrogated over 100 billion times at a 10-megacycle rate with no significant loss in output signal. Operational frequencies of up to two megacycles have been successfully used.

Bernoulli discs use a flexible disc of thin plastic material with magnetic coating. The disc is rotated close to a smooth backing plate with read/write heads embedded flush with the surface. High rotational speeds introduce centrifugal forces which cause the disc to conform to the backing plate, maintaining small head-to-disc separation distances. A typical system uses a 12½ inch diameter disc, 0.010 inch thick, and is reported to have a storage capacity of $5 \times 10^5$ bits. Presently available discs have a wide range of transfer rates of up to 500 kc. serial reading.

The Fluxlok memory is an electronically alterable, nondestructive read storage using standard ferrite memory cores. The drive conductors are orthogonally oriented across the core faces permitting nondestructive reading. Reading rates are comparable to standard ferrite core memories, but write rates are extremely slow. Multiple (approximately 20) current pulses are required for writing due to the inefficient coupling between the drive conductors and core.

In summary the above review of the computers and technology applicable to random access, nonvolatile, nondestructive read-out, memory devices shows that none are satisfactory for one or more of the following reasons. The storage media are not removable from the equipment for up to one-year shelf storage, cost of the storage media is excessive, storage capacity of the media is too low, and, all use mechanical mechanisms with the exception of the core and cryogenic devices which requires high drive currents (power) or cooling.

Information can be stored electrostatically by means of exposure from a cathode ray tube image which selectively discharges a charged xerographic plate. Read-out is accomplished by optical methods after the plate is toned with electrostatically charged fine powder. This method offers optical scanning, high storage density, and random access.

In a modification of the xerographic process read and write are also accomplished by optical means, but the information is stored differently. The xerographic plate is coated with an electrostatically deformable surface which wrinkles ("frosts") in the charged areas when the surface is softened by heating. In read-out, the cathode ray tube spot, scannin gthe frosted surface, is diffusely transmitted or reflected, thus producing a space in binary code; scanning a nonfrosted surface is specularly transmitted or reflected, producing a mark. System, methods and apparatus describing deformable surfaces for reproducing images are disclosed in the copending applications Ser. Nos. 193,245 and 193,277, assigned to the same assignee as the instant application, which are now U.S. Patent Nos. 3,238,041 and 3,196,011, respectively.

Research on converting electrostatic images (formed by optical exposure of charged photoconductors) into visible images has included using electrostatic forces to deform liquid and plastic dielectrics. Feasibility has been established for employing optically formed electrostatic images to form visible, projectable images on plastic-overcoated xerographic plates, both of opaque and transparent types.

Plastic overcoatings on xerographic plates have been electrostatically deformed to produce images visible by (1) light interferences, (2) relief deformation, or (3) random "dimpling" or "pitting" of the surface. The last-named Frost deformation technique responds directly to broadly charged areas, so that solid area coverage and uniform response are attained without the need for optical or physical screening.

The present invention relates to a data storage system utilizing a material that consists of a deformable thermoplastic film overcoating upon a panchromatic xerographic plate. The technique is that of developing the overcoating as a "frosted" layer to produce a uniform image without the necessity of screening. Thus the frosted image constitutes a uniquely advantageous approach to the storage of computer memory data in which a large amount of information must be stored in a readily available manner and by a method which is simple and involves no complicated mechanical or chemical development procedure.

In particular, the computer memory system of the present invention possesses advantages which systems utilizing other available materials and techniques do not have, such as a high degree of scattering which makes its use compatible with conventional optics, requires no screen exposure, simplified process, and permits the use of separate high-speed photoconductors which make possible the use of CRT tubes at reasonable speeds.

It is accordingly a principal object of the present invention to provide a new and improved computer memory storage system utilizing a novel storage media.

It is a further object of the present invention to provide a new and improved computer memory storage system that is capable of storing large amounts of information without the use of complicated mechanical or chemical development procedure.

Another object of the present invention is to provide a new and improved computer memory storage system that is compatible with conventional optics and permits the use of CRT tubes at reasonable speeds.

Another object of the invention is to provide a new and improved memory storage computer system utilizing a deformable thermoplastic film as the storage media.

Still another object of the invention is to provide a computer memory storage system utilizing a CRT scanning system, a deformable thermoplastic film as the storage media, and a new and improved optical arrangement.

Figure 2:
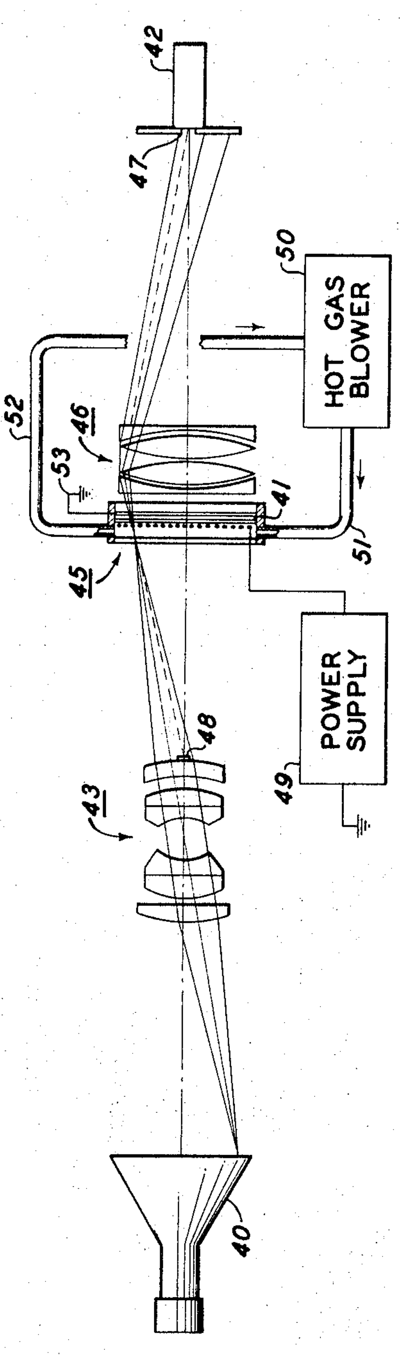
Figure 6:
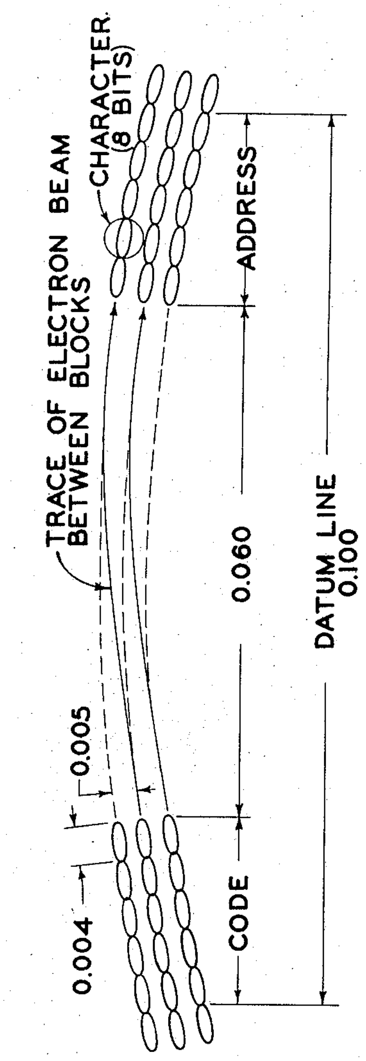
Figure 3:
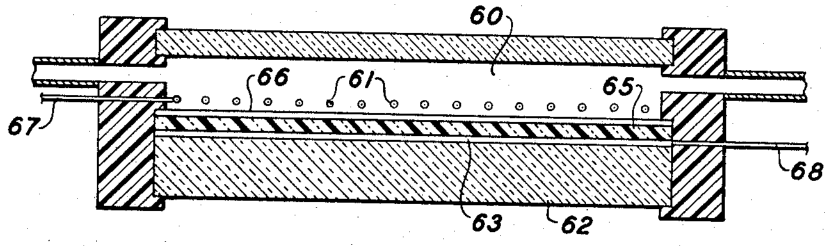
Figure 5:
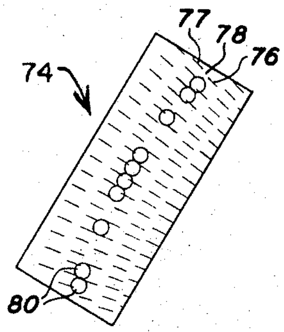
Figure 4:
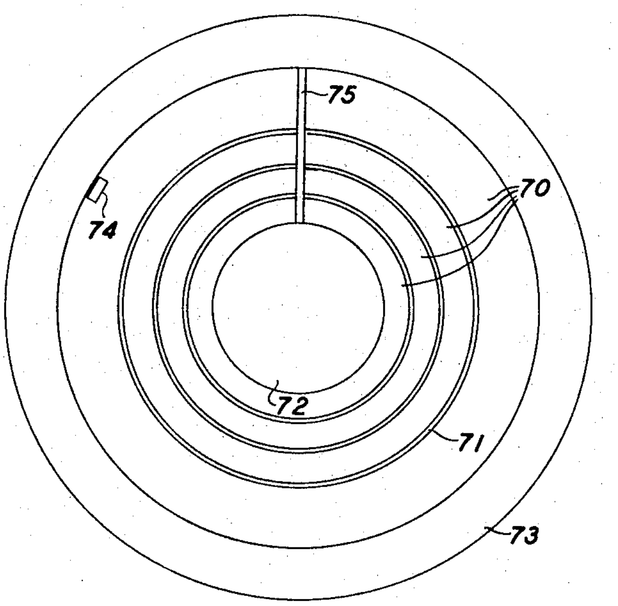
Figure 7:
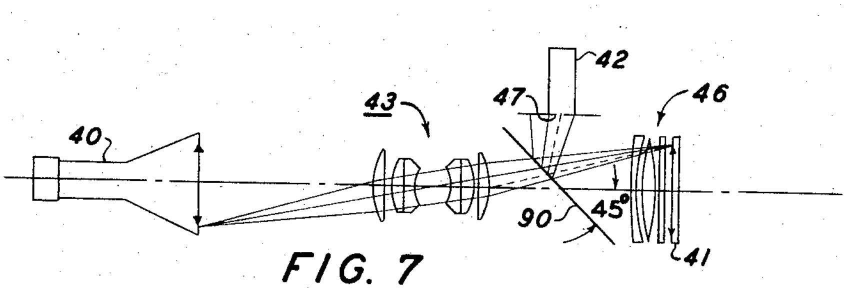
Figure 8:
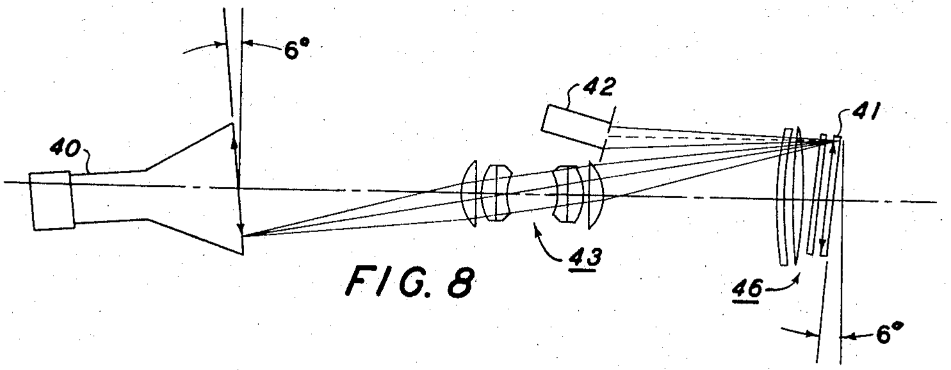
Figure 9:
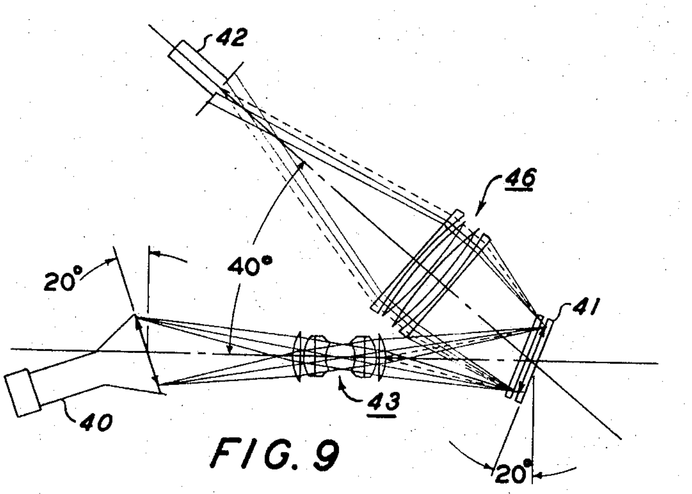

Further objects and features of the present invention will become apparent from the following detailed description when taken in conjunction with the drawings in which:

FIG. 1 is a block diagram of the complete data processing system in accordance with the invention, FIG. 2 is a digrammatic illustration showing the optical subsystem of the system in FIG. 1, FIG. 3 is a view in cross-section of the imaging media and support housing, FIG. 4 is a surface view of the imaging media itself, FIG. 5 is an enlarged portion of FIG. 4 showing the clock marks and recording track, FIG. 6 is an enlarged portion of FIG. 4 showing a section of the datum line, FIG. 7 is a diagrammatic illustration of a second embodiment of the optical sub-system, FIG. 8 is a diagrammatic illustration of a third embodiment of the optical sub-system, FIG. 9 is a diagrammatic illustration of a fourth embodiment of the optical sub-system.

An electronic digital computer memory system utilizing all electronic active parts with the exception of blowers is illustrated by block diagram in FIGURE 1. The main controlling component is the logic block 10 which controls the various functions of the system by logic circuits operated by digital information from electronic data processing input 11. A cathode ray tube flying spot scanner 12 operates as a light source to record and readout information from a photosensitive media 13. The scan pattern described by the cathode ray tube spot is controlled by the address verify and scan control block 15 in accordance with digital information from the electronic data processing input as processes by logic block 10. Thus address verify and scan control block 15 has an output to frequency control block 16 which in turn controls the frequency of the X sweep generator 17 and Y sweep generator 18. The X sweep generator and Y sweep generator operating at the same frequency and amplitude supply two sine wave signals displaced 90° in phase from each other to deflection amplifiers 20. The deflection amplifiers in turn operate the deflection elements of cathode ray tube 12 and, by virtue of the two sine wave signals operating 90° out of phase, the cathode ray tube beam describes an exact circula pattern on the face of the cathode ray tube. In a preferred embodiment, photosensitive media 13 has separate recording zones which are operated at different cyclical frequencies of circular scan. For this reason the address verify and scan control block 15 has an output to a frequency control block 16 and acts to control the frequency of the X and Y sweep generators in accordance with the particular zone of media 13 being scanned as determined by the address.

This will be understood more fully in detailed discussion of the media and of the read-in and read-out operation which will be given below.

The diameter of the circle scan pattern is determined by the amplitude of the sine waves produced by the X and Y sweep generators. This amplitude is controlled by voltage control 21 through reference power supply 22. As with the frequency control this voltage control is the function of the address and so receives its input from the address verify and scan control block. Since optimum resolution is required from cathode ray tube 12, an automatic focusing control is required to maintain focus through variations in deflection amplitude of the electron beam. Thus, dynamic focus amplifier 23 is operated in accordance with deflection amplifier current to maintain focus. Circuitry for dynamic focus correction is discussed in detail in "How to Achieve Uniform CRT Spot Focus Over Entire Screen" by L. E. White, published in "Electronics Equipment Engineering," April 1963, at pages 67 to 71. In order to minimize error in the scanning operation, the media 13 is provided with clock marks permanently imaged in concentric tracks on the recording surface. As used herein, the term clock marks is intended to define a series of identical marks evenly spaced so that the marks repeat as a function of a predetermined frequency. In scanning, these marks are detected along with other image material by photomultiplier tube 25.

The photomultiplier output is amplified by amplifier 26, and then the clock mark information is selected out by two tuned filters. These filters are illustrated as a 180 kc. filter 27 and a 220 kc. filter 28. These are broadly tuned filters so that when the scan rate is in the near vicinity of the exact address rate, the series of clock marks will come out within the band pass of these two filters. Since low frequency clock marks are placed on one side of a recording track and high frequency clock marks are displaced symmetrically on the opposite side of a recording track it will be understood that the output of these two filters will be identical when the spot is correctly centered in the recording track. The output of the two filters is compared in difference amplifier 30 and when the output of the two tuned filters is different a signal is sent to the address verify and scan control block through which error correction is made by means of voltage control block 21. Voltage control block 21 adjusts the amplitude of the sweep generator outputs to correct tracking on the spot from the cathode ray tube. The output of the tuned filters is also counted by means of track counter 31 to count the tracks for rapid access. For random access the sweep pattern begins on expanding spiral from the center to reach the address location. Each time the sweep crosses a clock track, the band pass filter for the particular frequency puts out a maximum signal while the other filter puts out a minimum signal. These fluctuations are counted by the track counter to determine the correct track. The track count is compared in comparator 36 with the input address from the address verify and scan control block for rapid location of the desired track.

Address information on the media as called for by logic block 10 is verified through the signal output channel from the media, that is, photomultiplier tube 25, amplifier 26, filter circuit 32 comprising band reject filters for filtering out clock mark frequencies, a second amplifier 33 and a pulse shaping circuit 35. The pulse shaping circuit passes a signal to comparator 36 which compared the address from the media with the address called for from logic block 10 via address verify and scan control block 15. In recording information upon media 13, a digital input first calls for sensitizing media 13 by operation of charging block 37. Intensity modulation of the cathode ray tube beam is provided to write gate 38 under control of the data rate clock 40 which maintains the writing speed at the design bit rate which is described for purposes of the present invention as 200 kilocycles. It should be understood that the specific frequencies referred to for scan rate, clock mark frequencies, and recording frequencies, are for purposes of giving a more complete exemplary embodiment and are not to be considered limiting. During recording read-gate 41 is gated off by logic block 10 so that no output occurs. After recording of media 13 is completed, the media is developed by develop block 42 and is then ready for read-out as desired. In read-out the read-gate 43 operates to set the cathode ray tube electron beam at a fixed high intensity for read-out scanning of the media. Logic block 10 then operates to turn on read-gate 41 for output.

The basic optical system is shown in FIG. 2 with cathode ray tube 40 used for both writing and reading. The memory medium 41 is transparent photosensitive Frost element and contains a 1:1 image of the CRT. A detailed disclosure of Frost deformation of the type disclosed in U.S. patent application, Ser. No. 193,277, filed May 8, 1962 which issued July 20, 1965, as Patent No. 3,196,011. As described in that application and as used herein, the term "Frost" generally describes a random minute wrinkling produced by electrostatic charge on a soft insulating thermoplastic layer.

An $80 \times 10^6$ bit memory image on both the CRT and Frost will be arranged as shown in FIGS. 4, 5 and 6. The polar coordinate system has been used to conserve the maximum information on the tube, and to minimize the angular field coverage of the optical system. Furthermore, the circular tracks are long enough that a whole block of memory can be contained on a single track, requiring no flyback of the electron beam within a block.

The optical system illustrated in FIGURE 2 comprises cathode ray flying spot scanner 40, photosensitive media 41 and photosensing device 42. While the Frost photosensitive media is depicted in FIGURE 2 as a transparent material for transmission projection, it will be understood that, with suitable arrangement of the optics, an opaque photosensitive media can also be used with projection of the image by reflection techniques. As used herein, "photosensitive media" is intended to encompass photosensitive media in either a sensitive or non-sensitive condition. Thus, a photoconductive Frost plate for the purposes of this application is considered to be a photosensitive media even though it has been exposed and is no longer sensitive. Support frame 45 positions photosensitive media 41 in the optical system. Support frame 45 preferably includes transparent cover plates to protect the photosensitive media from dust and abrasion.

The optical system employs objective optics 43 for imaging the CRT spot on the photosensitive medium. This is illustrated as a 1 to 1 relay. Enlargement would allow for a lower resolution media while in fact the most suitable media have greater resolution capabilities than present flying spot scanners. Reduction would allow readily for smaller media, but since the usable face diameter of present commercial high resolution cathode ray tubes is quite limited, the media size for a 1 to 1 ratio is not large. Media 41 is mounted in support means 45 illustrated as a frame with a glass protective cover. Frost recording requires a somewhat complex optical system due to the light scattering characteristics. Thus a mask 48 may be placed in the objective optics. This mask is imaged by the collective optics 46 on photomultiplier aperture 47. Light diffused by a Frost image will be scattered so that some of it will enter the photomultiplier tube aperture which normally is unilluminated due to the mask. When a mask is used for this purpose, it has been found desirable to provide a photomultiplier aperture somewhat larger than the mask image to permit passage of some light at all times providing for track sensing as will be fully explained below.

Relay lens 43 must be high definition; specifically, 70% of the energy from a point source must be within 0.0003 inch over the whole format. This is accomplished with an $f/3$ lens which will allow an $f/6$ beam in the object and image spaces at 1:1. This gives a theoretical resolution of 300 lines per millimeter. To obtain good definition over the format of 6-inch diameter, the semi-field angle must not exceed 10 degrees, leading to an 8.5 inch focal length, or 34 inches from CRT to Frost. The overall length of the system can be shortened by the use of mirrors.

A Gauss-type photographic objective as shown in FIG. 2 is suitable. In practically all photographic objectives the field aberrations are much worse than the axis aberrations. Although off-axis resolving power may be fairly high, contrast is poor. In other words, 10% of the energy may be within a small circle (producing good resolution), but 70% will be spread over a fairly wide area. The aberration which causes most of the image spread and is the most difficult to correct, is oblique spherical aberration. The Gauss-type lens is uniquely advantageous in that oblique spherical aberration can be corrected by changing the length of the central air space. As a result, this lens concentrates the energy almost as well in the field as on-axis if the field is limited to 10-degree half-angle.

The collective optics 46 will image the mask on the photomultiplier aperture at 1:1. Since the aperture is slightly larger than the mask, some light will always reach the photomultiplier, as required to obtain signals from the clock tracks.

The optics are appropriately two 15 inch $f/2$ telescope doublets. Each doublet is air-spaced to correct higher order spherical aberration required by the $f/2$ aperture.

The processing of the Frost image is required in recording. This involves a charging step prior to exposure from the CRT and a heating step subsequent to exposure to produce the physical deformation of the plastic layer. By further application of heat the image can be erased by allowing surface tension forces to smooth out the Frost layer. None of these steps requires a vacuum atmosphere.

These steps can be accomplished conceptually by the configuration shown in FIG. 3. Here the Frost medium 41 is mounted in a retainer 45 with a cover glass in close proximity to it. The unit is assembled so that the intermediate gas space 60 is sealed in assembly to eliminate contamination.

A parallel array of very fine corona charging wires 61, closely spaced, is mounted in the air space at a uniform distance from the Frost medium. In order to maintain compact size, the corona wires are spaced in the range of one quarter to one-half inch from the plastic layer. At one-quarter inch spacing it is necessary to use corona wire of AWG 48 or finer. Further details on corona charging can be found in U.S. Patent 2,932,742.

The Frost medium consists of a transparent substrate 62, a transparent conducting layer 63, sch as stannic oxide, a layer of transparent photoconductor material 65 and a plastic overcoating 66. Further details on a Frost medium will be found in afore mentioned patent application, Ser. No. 193,277. External contacts 67 and 68 are provided on the supporting material for the conductive layer and the corona wires. The supporting material is a dielectric for electrical isolation.

Charging is accomplished electrically by corona techniques. A high voltage is applied to the corona wires through contact 67, in the absence of light. Conducting layer 63 of the Frost media is maintained at ground potential through contact 68 by ground connection 53. At sufficiently high voltage from power suppy 49, the air near the corona wires is ionized electrically and a cascade of charge results from the field existing between the corona wires and the conducting layer. A uniform charge layer is deposited on the top side of the plastic coating, and an opposite charge is induced at the interface between the conductor and the photoconductor. The plate is now sensitized for exposure.

During the exposure step, the photoconductor is exposed to patterns of light which selectively cause the resistance of the photoconductor to be lowered. Hence, the trapped charge can migrate through the photoconductor to the interface with the plastic overcoating where it again becomes trapped. The local electric fields through the overcoating are intensified by the close proximity of this charge, thus producing an electrostatic image. Further intensification of the fields results from a second charging step after exposure, raising the charge on the top surface to a uniform value.

Plastic deformation is produced by applying heat to the plastic layer. This can be done by blowing hot gas across the plastic layer. FIG. 2 illustrates heating by a hot gas blower 50 blowing hot gas through inlet duct 51 and returning it through return duct 52. This is preferably a closed system with filters to prevent contamination of the plastic layer.

Erasure is accomplished by the application of additional hot gas to raise the temperature of the plastic layer to the level where surface tension forces will smooth it out. An inert gas such as nitrogen is preferred to air since air has been found to react with most suitable plastics producing a hardening effect with time. This aging is believed due to an oxidizing reaction with the oxygen in air.

In operation an image is recorded on photosensitive media 41 by scanning the media with a light spot from flying spot scanner 40 while modulating the light spot in accordance with data to be recorded. The latent image thus produced on the photosensitive media is then developed and may be read out by scanning the media with flying spot scanner 40 while maintaining a constant spot intensity. The light as modified by the developed media illuminates aperture 47 of photosensing device 42. Photosensing device 42 is suitably a photomultiplier tube or other photodetecting device capable of putting out an electrical signal representative of varying light intensity.

While all processing of the photosensitive media can be carried out while in a fixed position in the optical system, it is an advantage of the present arrangement that the media may be readily removed and replaced without danger of introducing tracking inaccuracies. Thus, development can be performed by removing the media to separate development apparatus. The developed media is then returned to the optical system for readout as desired.

FIGURE 4 illustrates an exemplary embodiment of the photosensitive media 41. While the media is illustrated here in a circular configuration, this is not a necessary limitation. In many systems, greater ease of handling will be obtained with a rectangular configuration for media 41 in which only a circular portion of the media is used to carry information. Preference for a circular information carrying area on media 11 is dictated for optimum use of a cathode ray tube as a flying spot scanner. This is so since off-axis distortion is one of the greatest distortion factors in a cathode ray tube, and the maximum amount of area covered with a cathode ray tube with a minimum of off-axis operation is in a circular pattern. The use of a circular pattern also eliminates the need for retrace and retrace blanking in operation of the cathode ray tube. Photosensitive media 41 is illustrated as comprising four recording zones 70. Each zone comprises a plurality of recording tracks with a small amount of dead space 71 between the zones. Further dead space 72 is allowed at the center so that the shortest circular track will be able to carry a substantial block of information. Dead space 73 is also allowed at the outside of the member for handling purposes.

Breaking the recording surface up into zones is conventional in magnetic disc file memories. The reason here, as with magnetic disc memories, is to enable operation with the same angular velocity on tracks that are within a limited radius of the center. Then, when the linear scanning velocity becomes too great for economic density in recording, the angular velocity is stepped down so that the recording velocity on the inside track of an outer zone is the same as the linear recording velocity at the inside track of an inner zone. The number of zones used and the number of tracks used within each zone is not of critical significance and is varied to suit the requirements of particular systems. Generally, the width of the zones are adjusted so that the ratio of the radius to the inner track to that of the outer track for each zone is the same as that of every other zone. With these ratios observed, the recording velocity on every outer track will be the same as will be the recording velocity of every inner track. A more detailed discussion of zones and tracks can be found in "Disc File Memories" by Harold J. McLaughlin in the November 1961 issue of "Instruments and Control System," pages 2063–2068. Each track begins and ends at datum line 75. The datum line is recording space allocated for coding and address purposes.

In an exemplary embodiment, the format is divided into four zones each with its own constant angular velocity. In fact, the linear velocities of the inside tracks of all zones will be identical. Since the ratio of the inside radius to the outside radius is approximately the same for all zones, linear rates of outside tracks are approximately equal. As a result, the change in optical exposure within a block of the memory device is minimized.

For the inside track of each zone, the separation of bits used in the calculations is 0.0005 inch centerline to centerline, both radially and tangentially. An 8-bit character will use 0.004 inch tangentially along the inside track. The radial dead space between the four zones is 0.004 inch. The datum line (FIG. 6) required for each track, or block, is 25 characters (200 bits) long, or 0.100 inch for the inside track. The first five characters of the datum line will contain a special code to indicate the presence of the datum line. The last five characters will give the address of the first character in the track. (Five-character address is sufficient, since the starting address always end in 00.) The 15-character separation (0.060 inch for the inside track) will permit the electron beam to skip to the next outer track.

To keep the CRT tracking in exact circles, clock marks are permanently printed in tracks on the surface of the recording media. As used herein the term "clock marks" is intended to define a series of identical marks evenly spaced so that the marks repeat as a function of a predetermined frequency. A small segment 74 of the outer zone is enlarged in FIGURE 5 to show the clock tracks 76 and 77 on either side of a recording track 78. The clock marks are preformed in opaque lines on the photosensitive media during manufacture. This preforming of the clock marks may be accomplished in any one of several ways as desired. For example, the clock marks may be put on in a straight forward xerographic manner by exposure through a transparency containing the clock marks and then conventional xerographic development with fusing right to the Frost media. Various photo etching techniques are also suitable for imprinting the clock marks on the media. For simple servo circuitry as will be further disclosed below, it is necessary that the clock marks be accurately spaced in such a way that the clock frequencies will remain constant in each of the tracks for the scan rates used. This requires that within each zone the clock mark spacings have to increase with the successive tracks going toward the outer edge of the zone. However, the clock mark spacing for the inner track would be the same for all zones since, as has been stated above, the zones and scanning speeds are preferably arranged and selected so that the recording velocity is the same on the inner track of each zone. As shown in FIGURE 5, the clock marks on one side of a recording track have a higher frequency than on the other side of the recording track. Signals representing the clock marks are picked up by the photomultiplier tube and the servo circuitry operates to move the scanning beam radially to balance the signals of the two sets of clock marks. This can be understood better by referring to FIGURE 1.

The layout of the media can be most readily explained by giving a complete example. The chart below gives figures for a media to be operated with a seven inch cathode ray tube and having a design storage capacity of 10,000,000 characters with 8 bits to each character. The chart should be considered together with FIGURES 4, 5 and 6.

tracking. These clock marks have been left out of the datum line illustration in FIG. 6 for simplicity. FIG. 6 illustrates the details of a three track segment of datum line 75. The datum line width and character dimensions given are for the inside track of each zone and are larger for outer tracks. The curvature is also exaggerated for illustrative purposes.

In certain instances, a reflection memory device may be required on the system to obtain the results desired. Accordingly, there is shown in FIGS. 7, 8, and 9 alternate arrangements of the CRT lens and photomultiplier that make up the optical system of the present invention.

In FIG. 7, a beam splitter 90 is added. In this way the light reflected by the memory device 41 can be sent to a photomultiplier 42 at the side. The beam splitter 90 must be very thin (a pellicle) to prevent astigmatism in the image on the memory device. Transmission should be high so as not to lower writing speed appreciably. Although the light reaching the photomultiplier is decreased greatly, the gain can be increased to compensate.

The relay lens must be overcorrected to compensate for the error introduced by the collective optics.

In a typical embodiment of this alternative arrangement the following parameters were used: CRT 6" $\phi$; relay optics 8.5" $f$13, semi-field 10°, images CRT on Frost at 1:1, .5" mask; .55" aperture on photomultiplier; pellicle beam splitter, reflection 8% approximately, transmission 92% approximately; collective optics 11" $f$/1.8, images mask on aperture at 1:1; and reflection memory device 6" $\phi$ was used.

In FIG. 8, another alternative arrangement of the CRT, lenses and photomultiplier ssytem is shown. In this embodiment the CRT 40 and memory device 41 are tilted 6 degrees. This permits the photomultiplier 42 to be placed beside the relay lens 43 thereby eliminating the beam splitter.

A circular track on the CRT will be imaged with one side shortened and the other side lengthened, each by a little less than 4%. The clock tracks may be put on the memory device as circles. An alternative would be to photograph the clock tracks using the same tilted optical system.

| Diameter Range (inch) | Ratio of Diameter | Space Between Areas | Minimum Circumference | Characters in Each Track of Datum Line | Memory Characters Per Track | Tracks in Area | Memory Characters in Area |
|---|---|---|---|---|---|---|---|
| 2.070 to 2.698 | 1.30 | 0.004 | 6.500 | 25 | 1,600 | 628 | 1,004,800 |
| 2.706 to 3.462 | 1.28 | 0.004 | 8.500 | 25 | 2,100 | 756 | 1,587,600 |
| 3.470 to 4.481 | 1.29 | 0.004 | 10.900 | 25 | 2,700 | 1011 | 2,729,700 |
| 4.489 to 5.826 | 1.30 | 0.004 | 14.100 | 25 | 3,500 | 1336.54 | 4,677,900 |
| Total | | | | | | 3731.54 | [1] 10,000,000 |

[1] Or 80,000,000 bits.

It will be noted that about 2 inches of dead space diameter have been allowed in the center and the outer memory track is at 5.826 inches so that the cathode ray tube does not have to operate in extreme off-axis sweep. The range of diameters for each zone increases with successive outer zones to maintain the diameter ratios about equal. While in an optimum design, the diameter ratios would be identical, they have been varied slightly in this example in order to maintain round figures in the number of memory characters per track.

Referring to FIG. 5, the recording track 78 is illustrated as containing a series of bits 80. The bit size for the example is about .0005 inch in diameter allowing about .004 inch for each character.

The clock marks as illustrated at 76 and 77 are continuous through datum line 75 to maintain continuity in Still another alternative arrangement of the optical system is shown in FIG. 9. In this embodiment the CRT 40 and the memory device 41 are tilted 20 degrees. In this way the rays from the mask (dashed lines) can be reflected to the side of the relay lens. A large collective lens would image the mask on the photomultiplier aperture 47.

With the CRT and memory device tilted 20 degrees, it will be necessary to photograph the clock tracks using the same tilted optical system.

While the present invention has been described as carried out in specific embodiments thereof, there is no desire to be limited thereby, but it is intended to cover the invention broadly within the spirit and scope of the appended claims.

What is claimed is:

1. A computer memory storage system comprising: a light source operative to produce a light spot, means for tracking said light spot in a predetermined pattern, and means to modulate said light spot in accordance with the intelligence to be stored during a record mode, means to set said light spot at a fixed high intensity during a read mode, a photosensitive medium having an electrostatically deformable surface, a first lens system comprising an objective optical lens for imaging said light spot on said deformable surface, means for forming on said surface a latent electrostatic image of said intelligence, and means for deforming said surface in accordance with said electrostatic image to retain said image; a mask positioned on said objective lens for masking said light spot, photomultiplier tube system operative to convert a light beam into electrical signals, said photomultiplier tube including an aperture adapted to receive said light, a second lens system comprising a collective optical lens for imaging said mask on said aperture of said photomultiplier tube, said deformed surface operative to diffuse said masked light source to scatter said light to said collective lens thereby permitting light to enter through said aperture in said photomultiplier.

2. A computer memory storage system as set forth in claim 1 wherein said objective optical lens is a 1 to 1 relay.

3. A computer memory storage system as set forth in claim 1 wherein said collective optical lens is a 1 to 1 relay.

4. A computer memory storage system as set forth in claim 1 wherein said aperture in said photomultiplier is slightly larger than said mask on said objective lens.

5. A computer memory storage system as set forth in claim 1 wherein said photosensitive medium further includes means for placing a uniform electrostatic charge on the surface thereof.

6. A computer memory storage system as set forth in claim 1 wherein said means for deforming said surface of said photosensitive medium comprises means for heating said surface.

7. A computer memory storage system as set forth in claim 1 wherein said photosensitive medium further includes means for erasing said deformed surface.

8. A computer memory storage system as set forth in claim 1 wherein the axis of said light source, the control axis of said objective lens, the central axis of said collective lens, and said aperture in said photomultiplier are in line with each other.

9. A computer memory storage system as set forth in claim 1 wherein the axis of said light source, the central axis of said objective lens, and the central axis of said collective lens are in line with each other; wherein said photomultiplier tube is positioned vertically between said two lenses and out of the light path, and means interposed in said light path for directing said light to said aperture in said photomultiplier.

10. A computer memory storage system as set forth in claim 1 wherein the axis of said light source and the axis of said photosensitive medium are tilted with respect to a line passing through the major axis of said objective and collective lenses, and wherein said photomultiplier is displaced to one side of said objective lens with its aperture in direct line with the light reflected from said collective lens.

11. A computer memory storage system as set forth in claim 1 wherein the axis of said light source and the axis of said photosensitive medium are tilted with respect to the primary axis of said objective lens, and wherein the primary axis of said collective lens is in direct line with the aperture in said photomultiplier and the image reflected by said collective lens.

12. A computer memory system comprising:

(a) a cathode ray flying spot scanner;
(b) a deformable electrophotographic storage media;
(c) a photosensing device for supplying an electrical signal output representative of a light input;
(d) two sine wave sweep generators producing equal amplitude outputs differing 90° in phase driving said scanner in a circular sweep;
(e) a first lens system for focusing the spot from said scanner on said storage media;
(f) a mask blocking out a center portion from the output of said first lens system;
(g) a second lens system for focusing the image of said mask on said phtosensing device, said mask operating to block light from said photosensing device in the absence of a light scattering deformation in said storage media;
(h) electrostatic charging means for sensitizing said storage media;
(i) heat softening means for developing said storage media; and
(j) logic means responsive to a digital input connected to said sweep generators for driving said spot to a selected address location on said storage media and further connected to gating means for gating both write information to modulate the scanner spot intensity in a record mode and a read signal to provide a uniform high intensity to said spot in a read mode.

References Cited

UNITED STATES PATENTS

| | | | |
|---|---|---|---|
| 2,896,507 | 7/1959 | Mast | 88—61 |
| 3,055,006 | 9/1962 | Dreyfoss | 340—173 |

FOREIGN PATENTS

| | | |
|---|---|---|
| 1,247,019 | 10/1960 | France. |

BERNARD KONICK, *Primary Examiner.*

T. W. FEARS, *Assistant Examiner.*